(12) United States Patent
Crawford et al.

(10) Patent No.: US 6,896,966 B2
(45) Date of Patent: May 24, 2005

(54) ARTICLES OF MANUFACTURE INCORPORATING POLYESTER/ POLYCARBONATE BLENDS

(75) Inventors: Emmett Dudley Crawford, Kingsport, TN (US); Robert William Seymour, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 140 days.

(21) Appl. No.: 10/302,001

(22) Filed: Nov. 22, 2002

(65) Prior Publication Data

US 2004/0101687 A1 May 27, 2004

(51) Int. Cl.$^7$ ............................................... C08G 63/02
(52) U.S. Cl. .................... 428/412; 264/176.1; 264/219; 528/193; 528/194; 528/196; 528/198; 528/271; 528/272
(58) Field of Search .............................. 264/176.1, 219; 528/193, 194, 196, 198, 271, 272; 428/412

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,094,508 A * | 6/1963 | Butterworth et al. ....... 528/198 |
| 3,148,172 A | 9/1964 | Fox |
| 3,153,008 A | 10/1964 | Fox |
| 3,271,367 A | 9/1966 | Schnell et al. |
| 3,546,008 A | 12/1970 | Shields et al. |
| 3,734,874 A | 5/1973 | Kibler et al. |
| 4,025,492 A | 5/1977 | Binsack et al. |
| 4,111,846 A | 9/1978 | Elliott, Jr. |
| 4,123,436 A | 10/1978 | Holub et al. |
| 4,136,089 A | 1/1979 | Bier et al. |
| 4,176,224 A | 11/1979 | Bier et al. |
| 4,188,314 A | 2/1980 | Fox et al. |
| 4,208,527 A | 6/1980 | Horlbeck et al. |
| 4,233,196 A | 11/1980 | Sublett |
| 4,238,593 A | 12/1980 | Duh |
| 4,260,671 A * | 4/1981 | Merrill ......................... 430/67 |
| 4,391,954 A | 7/1983 | Scott |
| 4,786,692 A | 11/1988 | Allen et al. |
| 4,946,932 A | 8/1990 | Jenkins |
| 4,982,014 A | 1/1991 | Freitag et al. |
| 5,010,162 A | 4/1991 | Serini et al. |
| 5,290,631 A | 3/1994 | Fleury et al. |
| 5,413,870 A | 5/1995 | Flood |
| 5,468,836 A * | 11/1995 | Okano et al. ............... 528/204 |
| 5,478,896 A | 12/1995 | Scott |
| 5,543,488 A | 8/1996 | Miller et al. |
| 5,552,495 A | 9/1996 | Miller et al. |
| 5,643,666 A | 7/1997 | Eckart et al. |
| 5,646,237 A | 7/1997 | George et al. |
| 5,709,940 A | 1/1998 | George et al. |
| 5,894,048 A | 4/1999 | Eckart et al. |
| 5,958,539 A | 9/1999 | Eckart et al. |
| 5,998,028 A | 12/1999 | Eckart et al. |
| 6,025,069 A | 2/2000 | Eckart et al. |
| 6,162,890 A | 12/2000 | George et al. |
| 2003/0030172 A1 * | 2/2003 | Hoogland et al. .......... 264/161 |

OTHER PUBLICATIONS

R.N. Mohn, J.W. Barlow and C.A. Cruz, *Polyester–Polycarbonate Blends. III. Polyesters Based on 1,4–Cyclohexanedimethanol/Terephthalic Acid/Isophalic Acid*, Journal of Applied Polymer Science, 23, 575–587, (1979).

R.E. Wilfong, *Linear Polyesters*, Journal of Polymer Science, 54, 385–410, (1961).

* cited by examiner

Primary Examiner—Terressa Boykin
(74) Attorney, Agent, or Firm—B. J. Boshears; Bernard J. Graves, Jr.

(57) ABSTRACT

This invention relates to thermoplastic article having one or more decorative materials on the surface thereof which is obtained by applying heat and pressure to a laminate wherein said thermoplastic article comprises (1) one or more decorative materials; and (2) an upper or lower sheet material; wherein the upper or lower sheet material is formed from a polyester/aromatic polycarbonate blend.

35 Claims, No Drawings

ARTICLES OF MANUFACTURE INCORPORATING POLYESTER/POLYCARBONATE BLENDS

FIELD OF THE INVENTION

This invention pertains to a novel thermoplastic article having decorative materials on the surface thereof. More specifically, this invention pertains to an article produced by applying heat and pressure to a laminate comprising: at least one decorative material, for example, a fabric, metallic wire, paper, or printed layer, and an upper or lower sheet material, to produce a thermoplastic article having the decorative materials on the surface thereof. The novel thermoplastic articles provided by the present invention may be used in the construction industry as glazing for windows, in partitions and as decorative panels. The sheet material may be textured during or after formation of the articles.

BACKGROUND OF THE INVENTION

Glass, both transparent and translucent, has been used as glazing material for windows and partitions and, for certain uses, it is painted or stained to provide specific decorative effects. Glass is high in density and weight, is difficult to fabricate at the work site, is generally brittle, and can constitute a safety hazard.

Glass substitutes such as polyvinyl chloride sheeting, acrylic, e.g., poly(methyl methacrylate), sheeting and polycarbonate sheeting have been used as substitutes for glass in certain glazing applications. Generally, these substitutes are made for clear (transparent), non-decorative applications. The sheet material provided by this invention may be used primarily for producing or obtaining decorative applications with varying degrees of transparency and various levels of enhanced security.

Articles made from copolyester sheet are described in U.S. Pat. Nos. 5,894,04, 5,958,539, 5,998,028, 5,643,666, and 6,025,069. However, applications exist whereby higher creep/thermal resistances compared to neat copolyester are needed, for instance backlit paneling. In addition, replacing neat copolyester with neat polycarbonate is undesirable as well, since polycarbonate has to be dried prior to composite fabrication thereby increasing cycle time and cost. Polycarbonate also must be laminated at high temperatures, which can cause degradation of the decorative layer. Further, polycarbonate is difficult to post-form without pre-drying and requires higher forming temperatures.

U.S. Pat. No. 5,413,870 describes a sturdy wall covering especially useful in a bathroom or shower area, the wall covering being comprised of a laminate that includes a clear or transparent acrylic cast in the first layer, a clear polyester thermoset resin in the second layer, and a thin fabric sheet as the third layer and a pigmented polyester thermoset coating over the fabric layer. The polyester thermosetting resins in this case are applied as a liquid and subsequently cured as a solid. There are several difficulties when using polyester thermosetting resins. Removing air bubbles from the liquid thermosetting resins can be difficult. Thermosetting resins can undergo significant shrinkage during curing. In addition, crosslinked polyester resins are known to be brittle. This invention alleviates many of these difficulties.

Advantages of this invention over the prior art include higher heat deflection temperature (HDT), increased stiffness and increased creep resistance with time.

SUMMARY OF THE INVENTION

The present invention provides a thermoplastic article, typically in the form of sheet material, having a decorative material on the surface thereof. The thermoplastic article is obtained by applying heat and pressure to a laminate comprising, (1) at least one decorative material, and (2) at least one lower sheet material or upper sheet material. Optionally, an adhesive layer may be used between (1) and (2).

The upper or lower sheet materials are produced from miscible polyester/polycarbonate blends. The polyester component, as described below, preferably comprises a minimum level of 1,4 cyclohexanedimethanol as a comonomer in order to effect miscibility with polycarbonate.

DETAILED DESCRIPTION OF THE INVENTION

The invention relates to a thermoplastic article having a decorative material on the surface thereof obtained by applying heat and pressure to a laminate comprising, (1) at least one decorative material comprising metallic wire, rods or bars; natural fibers; glass fibers, mineral fibers, fabric, paper, and/or printed layer; and (2) at least one lower sheet or upper sheet material; wherein the upper or lower sheet materials are formed from a miscible polyester/aromatic polycarbonate blend comprising:

(a) 1 to 99 weight % of a polyester, comprising a diacid residue component selected from the group consisting of aliphatic, alicyclic, and/or aromatic dicarboxylic acids, wherein the aromatic portion of said aromatic dicarboxylic acid has 6–20 carbon atoms, wherein the aliphatic or alicyclic portion of said aliphatic or alicyclic dicarboxylic acid has 3–20 carbon atoms, and a glycol residue component comprising from 45 mole % to 100 mole % 1,4-cyclohexanedimethanol, and, optionally, at least one additional aliphatic glycol having 2–20 carbon atoms; wherein the total mole percentages for the glycol component equals 100 mole %.

(b) 99 to 1 weight % of an aromatic polycarbonate;

wherein the total combined weight percentage of polyester and polycarbonate in the polyester/polycarbonate blend equals 100 weight %.

A preferred blend composition is 50–90 weight % by weight of the polyester and 50–10 weight % by weight of the aromatic polycarbonate. An even more preferred composition is 60–80 weight % polyester and 40–20 weight % by weight aromatic polycarbonate.

Polyesters suitable in the context of the present invention are polyesters having repeating unit of the Formula I:

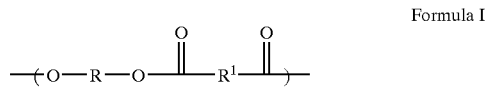

Formula I wherein R is the residue of 1,4 cyclohexanedimethanol or a mixture of 1,4 cyclohexanedimethanol and at least one aryl, alkane or cycloalkane containing diol having 2 to 20 carbon atoms or chemical equivalent thereof; and wherein $R^1$ is the decarboxylated residue derived from an aryl, aliphatic, or cycloalkane containing diacid of 3 to 20 carbon atoms or chemical equivalent thereof. Examples of the diol portion, R, are ethylene glycol, 1,2-propylene glycol, 1,3-propanediol, 1,4-butanediol, 1,5-pentanediol, 1,6-hexanediol, 1,2- or 1,3-cyclohexanedimethanol, neopentyl glycol, and 2,2,4,4 tetramethyl-1,3-cyclobutanediol. The preferred second glycol is ethylene glycol. Examples of the diacid portion, $R^1$, are malonic, succinic, glutaric, adipic, pimelic, suberic, azelaic, sebacic, dodecanedioic, 1,4-, 1,5-, and 2,6-decahydronaphthalenedicarboxylic acid, and cis- or trans-1,4-cyclohexanedicarboxylic acid. Examples of useful aromatic dicarboxylic acids are terephthalic acid, isophthalic acid, 4,4'-biphenyldicarboxylic, trans 3,3'-and trans 4,4 stilbenedicarboxylic acid, 4,4'-dibenzyldicarboxylic acid, 1,4-, 1,5'-, 2,3-, 2,6, and 2,7-naphthalenedicarboxylic acid. Chemical equivalents of these diacids include esters, alkyl esters, dialkyl esters, diaryl esters, anhydrides, salts, acid chlorides, acid bromides, and the like and are included within the scope of this invention. The preferred dicarboxylic acids are terephthalic and isophthalic acid or mixtures thereof. The preferred chemical equivalent comprises dialkyl esters of terephthalic and isophthalic acid. Mixtures of any of these acids or equivalents may be used.

A preferred polyester useful within the scope of this invention is a polyester having from 40 to 100 mole %, more preferably 60 to 80 mole % of 1,4-cyclohexanedimethanol wherein the total mole percentages of the glycol component in the polyester equal 100 mole %. The remainder of the glycol component may be any of the other glycols described herein but preferably is ethylene glycol in the amount of 0 to 60 mole %, more preferably, 20 to 40 mole %. Although any diacid as described herein may be used, 80 to 100 mole % terephthalic acid, is preferred for this embodiment.

Another preferred polyester useful within the scope of this invention is a polyester having from 100 mole % 1,4-cyclohexanedimethanol wherein the total mole percentages of the glycol component in the polyester equal 100 mole %. Also, in this particular embodiment, it is preferred that isophthalic acid is present in the amount of 5 to 50 mole %, more preferably, 20 to 40 mole %. Although any diacid as described herein may be used, it is preferred that terephthalic acid is present in the amount of 95 to 50 mole %

Conventional polycondensation processes, well known in the art, are used to prepare the polyesters of the present invention. These include direct condensation of the acid(s) with the diol(s) or by ester interchange using lower alkyl esters. The inherent viscosity of the polyesters of the present invention may range from about 0.4 to 1.0 dl/g at 25° C. in a solvent consisting of 60% by weight phenol and 40% by weight tetrachlorethane.

The polymerization reaction may be carried out in the presence of one or more conventional polymerization catalysts. Typical catalysts or catalyst systems for polyester condensation are well known in the art. Suitable catalysts are disclosed, for example, in U.S. Pat. Nos. 4,025,492, 4,136, 089, 4,176,224, 4,238,593, and 4,208,527, the disclosures of which are herein incorporated by reference. Further, R. E. Wilfong, Journal of Polymer Science, 54, 385, (1961) describes typical catalysts, which are useful in polyester condensation reactions. Preferred catalyst systems include Ti, Ti/P, Mn/Ti/Co/P, Mn/Ti/P, Zn/Ti/Co/P, Zn/Al, and Li/Al. When cobalt is not used in the polycondensation, copolymerizable toners may be incorporated into the copolyesters to control the color of these copolyesters so that they are suitable for the intended applications where color may be an important property. In addition to the catalysts and toners, other conventional additives, such as antioxidants, dyes, etc., may be used in the copolyesterifications in typical amounts.

One or more branching agents may also be useful in making the polyesters formed within the context of the invention. The branching agent can be one which provides branching in the acid unit portion of the polyester, or in the glycol unit portion, or it can be a hybrid. Some of these branching agents have already been described herein. However, illustrative of such branching agents are polyfunctional acids, polyfunctional glycols and acid/glycol hybrids.

Examples include tri or tetracarboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like are useful within the context of this invention. Trimellitic anhydride is a preferred branching agent. The branching agents may be used either to branch the polyester itself or to branch the polyester/polycarbonate blend of the invention.

Polycarbonates useful in this invention comprise the divalent residue of dihydric phenols bonded through a carbonate linkage and are represented by structural formulae II and III.

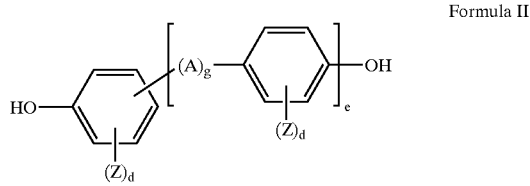

Formula II

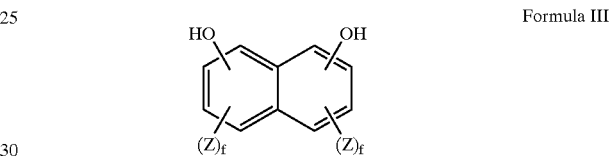

Formula III wherein:

A denotes an alkylene group with 1 to 8 carbon atoms; an alkylidene group with 2 to 8 carbon atoms; a cycloalkylene group with 5 to 15 carbon atoms; a cycloalkylidene group with 5 to 15 carbon atoms; a carbonyl group; an oxygen atom; a sulfur atom; —SO— or —SO$_2$; or a radical conforming to e and g both denote the number 0 to 1; Z denotes F, Cl, Br or C$_{1-4}$.alkyl; and if several Z radicals are substituents in one aryl radical, they may be identical or different from one another; d denotes an integer of from 0 to 4; and f denotes an integer of from 0 to 3.

By the term "alkylene" is meant a bivalent saturated aliphatic radical wherein the two valences are on different carbon atoms, e.g., ethylene; 1,3-propylene; 1,2-propylene; 1,4-butylene; 1,3-butylene; 1,2-butylene, amylene, isoamylene, etc. By the term "alkylidene" is meant a bivalent radical wherein the two valences are on the same carbon atoms, e.g., ethylidene, propylidene, isopropylidine, butylidene, isobutylidene, amylidene, isoamylidene, 3,5,5,-trimethylhexylidene. Examples of "cycloalkylene" are cyclopropylene, cyclobutylene, and cyclohexylene. Examples of "cycloalkylidene" are cyclopropylidene, cyclobutylidene, and cyclohexylidene. Examples of C$_{1-4}$.alkyl are methyl, ethyl, propyl, isopropyl, butyl, and isobutyl.

The dihydric phenols employed are known, and the reactive groups are thought to be the phenolic hydroxyl groups. Typical of some of the dihydric phenols employed are bis-phenols such as 2,2-bis-(4-hydroxyphenyl)-propane (bisphenol A), 3,3,5-trimethyl-1,1-bis(4-hydroxyphenyl)-cyclohexane, 2,4-bis-(4-hydroxyphenyl)-2-methyl-butane, 1,1-bis-(4-hydroxyphenyl)-cyclohexane, alpha, alpha'-bis-(4-hydroxyphenyl)-p-diisopropylbenzene, 2,2-bis-(3-methyl4-hydroxyphenyl)-propane, 2,2-bis-(3-chloro-4-hydroxyphenyl)propane, bis-(3,5-dimethyl4- hydroxyphenyl)-methane, 2,2-bis-(3,5-dimethyl-4-hydroxyphenyl)-propane, bis-(3,5-dimethyl-4-hydroxyphenyl)-sulfide, bis-(3,5dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, alpha.,.alpha.'-bis-(3,5-dimethyl-4-hydroxyphenyl)-p-diisopropylbenzene and 4,4'-sulfonyl diphenol. Other dihydric phenols might include hydroquinone, resorcinol, bis-(hydroxyphenyl)-alkanes, bis-(hydroxyphenyl)ethers, bis-(hydroxyphenyl)-ketones, bis-(hydroxyphenyl)-sulfoxides, bis-(hydroxyphenyl)-sulfides, bis-(hydroxyphenyl)-sulfones, and .alpha.,.alpha.-bis-(hydroxyphenyl)diisopropylbenzenes, as well as their nuclear-alkylated compounds. These and further suitable dihydric phenols are described, for example, in U.S. Pat. Nos. 2,991,273; 2,999,835; 2,999,846; 3,028,365; 3,148,172; 3,153,008; 3,271,367; 4,982,014; 5,010,162 all incorporated herein by reference. The polycarbonates of the invention may entail in their structure, units derived from one or more of the suitable bisphenols. The most preferred dihydric phenol is 2,2-bis-(4-hydroxyphenyl)-propane (bisphenol A).

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution. Suitable processes are disclosed in U.S. Pat. Nos. 2,991,273; 2,999,846; 3,028,365; 3,153,008; 4,123,436; all of which are incorporated herein by reference.

The polycarbonates of this invention have a weight average molecular weight, as determined by gel permeation chromatography, of about 10,000 to 200,000, preferably 15,000 to 80,000 and their melt flow index, per ASTM D-1238 at 300° C. is about 1 to 65 g/10 min, preferably about 2 to 30 g/10 min. The polycarbonates may be branched or unbranched. It is contemplated that the polycarbonate may have various known end groups. These resins are known and are readily available in commerce.

One or more branching agents may also be used in making the polycarbonates of the invention. Branching agents, such as tri- and tetrafunctional phenols and carbonic acids, as well as bisphenols with carbonic acid side chains are typically used. An example might include 1,4-bis (4',4"-dihydroxytriphenylmethyl)benzene, and trisphenol TC. Nitrogen-containing branching agents are also used. Examples might include: cyanic chlorid and 3,3-bis(4-hydroxyphenyl)-2-oxo-2,3-dihydroindole.

Polymer miscibillity is defined herein as a polymer forming a single phase.

The preferred miscible blends of this invention were first disclosed in Research Disclosure 22921, May, 1983, which concerns blends of polycarbonate with polyesters based on terephthalic acid and a mixture of 1,4-cyclohexanedimethanol and ethylene glycol. Similar miscible blends are disclosed in U.S. Pat. Nos. 4,786,692 and 5,478,896. Blends of polycarbonate with another family of polyesters, those based on a mixture of terephthalic and isophthalic acids with 1,4-cyclohexanedimethanol, are disclosed in U.S. Pat. Nos. 4,188,314 and 4,391,954. British Patent Specification 1,599,230 (published Jan. 16, 1980) discloses blends of polycarbonate with polyesters of 1,4-cyclohexanedimethanol and a hexacarbocyclic dicarboxylic acid. Mohn et al. reported on thermal properties of blends of polyesters based on 1,4-cyclohexanedimethanol and terephthalic acid or terephthalic/isophthalic acid mixtures with polycarbonate [J. Appl. Polym. Sci., 23, 575 (1979)], concluding that there were only slight differences in behavior between the two systems, and that these results were not unexpected. More recently, improvement to these miscible blend systems have been achieved and filed by the writers.

While a preferred embodiment of the invention is the laminate of the invention consisting of decorative layer (1) and upper or lower sheet material (2), it is also within the scope of this invention that there can be multiples of such laminates within the same thermoplastic article, i.e., decorative layer, upper or lower sheet material, decorative layer, upper or lower sheet material, etc. It is further contemplated within the scope of this invention that the thermoplastic article can comprise the laminate of the invention having multiple upper or multiple lower layers, i.e., decorative layer, upper or lower sheet material, upper or lower sheet material, upper or lower sheet material, etc. or any combination of decorative layer and upper or lower sheet material so long as one decorative layer remains on the surface of the thermoplastic article.

Optionally, an adhesive layer may be used between any of the layers described in the invention. The adhesive layer can comprise any adhesive known in the art. Specific examples within the scope of this invention are polyurethane, modified polyethylenes, sulfopolyesters, epoxy coatings all of which are known in the art. Sulfopolyesters useful as adhesives in the practice of this invention can be either linear or branched. Preferred sulfopolyesters have a glass transition temperature (denoted as Tg) between −25° C. and +90° C. More preferred sulfopolyesters have a Tg between 0° C. and +65° C. Even more preferred sulfopolyesters have a Tg between +5° C. and +55° C. Useful sulfopolyesters and their methods of preparation are described in U.S. Pat. Nos. 3,546,008; 3,734,874; 4,233,196; 4,946,932; 5,543,488; 5,552,495; 5,290,631; 5,646,237; 5,709,940; and 6,162,890. Alternatively, water dispersible phosphopolyesters, such as those described in U.S. Pat. No. 4,111,846 can be used advantageously but these polymers suffer from a lack of hydrolytic stability in aqueous systems and are, therefore, less desirable for practical use.

In addition to the preferred Tg ranges delineated above, useful sulfopolyesters have an inherent viscosity (a measure of molecular weight) of a least 0.1 and preferably at least 0.2 and more preferably at least 0.3 as measured in a 60/40 parts by weight solution of phenol/tetrachloroethane at 25° C. and a concentration of about 0.25 grams of polymer in 100 mL of solvent. For branched sulfopolyesters, such as those described in U.S. Pat. No. 5,543,488, preferred compositions have a number-average-molecular weight (Mn) of at least 4000 daltons.

The polyester/polycarbonate blends of this invention maybe made by conventional melt processing techniques. For examples, pellets of the polyester may be mixed with pellets of the polycarbonate and subsequently melt blended on either a single or twin screw extruder to form a homogenous mixture.

The miscible blend compositions of the invention may contain impact modifiers, UV stabilizers, stabilizers, nucleating agents, extenders, flame retarding agents, reinforcing agents, fillers, antistatic agents, mold release agents, colorants, antioxidants, extrusion aids, slip agents, release agents, carbon black, and other pigments, and the like all and mixtures thereof which are known in the art for their utility in polyester/polycarbonate blends. In particular, the use of phosphorous based stabilizers for further color reductions, if needed, is well known in the art.

The term "on the surface thereof" includes instances where the decorative layer is laminated or adhered to the surface of the upper or lower sheet material as well as instances where the decorative layer is set into surface of the upper or lower sheet material.

Another component of the thermoplastic articles of the present invention comprises a decorative material. The decorative material may comprise metallic wire, rods or bars; natural fibers, glass fibers, mineral fibers, fabric, papers; and printed layers.

For instance, fabric may be used as a decorative material to be encapsulated. The fabric may display images or decorative designs that have been produced, e.g., by weaving or knitting techniques, in the fabric. The fabrics, which may be used in producing the articles of the present invention, comprise textile fibers, i.e., fibers of natural-occurring, semisynthetic or synthetic polymeric materials. For example, the fabrics may be prepared from cotton, wool, silk, rayon (regenerated cellulose), polyester such as poly(ethylene terephthalate), synthetic polyamides such as nylon 66 and nylon 6, synthetic polyolefins such as polyethylene and polypropylene, acrylic, modacrylic and cellulose acetate fibers. The melting point of the textile fibers should be sufficiently high to avoid any degradation or distortion of the fabric during the manufacture or processing of the articles of this invention. The fabric may be woven, spun-bonded, knitted, or prepared by other processes well known in the textile trade and may be uncolored, e.g., white, or colored by conventional dyeing and printing techniques. Alternatively, the fabrics may be produced from dyed yarn or from filaments and yarn derived from mass colored polymers. Normally, the fabrics present within the thermoplastic articles of the present invention are substantially continuous and constitute a distinct layer. One embodiment of our invention, therefore, is a novel laminate article comprising, (1) a fabric layer composed or made of textile fibers, and (2) an upper or lower layer of a miscible polyester/polycarbonate blend as described hereinabove.

As another example, the second component (decorative component) of the thermoplastic articles of the present invention may comprise metallic wire, rod or bar. The metal wire may be formed by a variety of techniques to produce metal mesh fabric, screens, or open mesh having high transparency. The metal wire, rod or bar may be woven, welded, knitted, or fabricated by means of other processes well known in the metal wire fabrication trade. The metallic wire, rod and bar may be of various colors such as black, gray, green, blue, etc. The metallic element can be composed of different metallic materials such copper, aluminum, stainless steel, steel, galvanized steel, titanium, etc. or combinations thereof. The metallic component of the thermoplastic articles may be prepared from wire filaments, rods and bars having various cross-sectional areas and geometries, e.g., generally circular, oval or relatively flat. The thickness or diameter of the wire, rod and bar may range from about 0.001 to 19 mm (0.00004 to 0.75 inch) depending upon the end use of the thermoplastic article. However, for most of the articles of the present invention the thickness or diameter the wire, rod and bar will be in the range of about 0.0254 to 5.08 mm (0.001 to 0.20 inch). One embodiment of our invention, therefore, is a novel laminate article comprising, (1) a metal wire mesh, and (2) an upper or lower layer of a miscible polyester/polycarbonate blend as described hereinabove.

Still further, the decorative component may be decorative or printed papers, colored films, films printed with an image or picture, and the like.

The thermoplastic articles of our invention can be used in the manufacture of decorative walls, partitions, and glazing applications. The thermoplastic articles are thermoformable according to methods known in the art of thermoforming.

The upper and lower sheet materials used in the manufacture of the thermoplastic articles of the present invention may be the same or different. For example, the upper and lower sheet materials may be produced from different miscible polyester/polycarbonate blends (as defined herein) or miscible compositions that contain different additives, e.g., pigment additives that alter the transparency of the miscible polyester/polycarbonate sheeting.

The sheet material used in the preparation of the thermoplastic articles of our invention may be transparent, translucent, or one layer may be opaque, depending on the particular aesthetic effect desired. The upper and lower sheet materials may differ in degree of transparency or translucency and also in color. When the upper and lower sheet materials are produced from different miscible polyester/polycarbonate blends, the miscible polyester/polycarbonate blends must be thermally compatible. As used herein, the term "thermal compatibility" means that when layers of the sheet materials are bonded together under conditions of elevated temperature and pressure, the layers undergo approximately equal thermal expansion or contraction such that the solid surface is substantially planar.

The thickness of the sheet materials used in the preparation of the thermoplastic articles is not an important feature of the present invention and depends upon a number of factors such as functionality, weight, cost and the like. The sheet material from which the upper (or outer) layer or surface is formed generally has a thickness in the range of about 0.76 to 6.4 mm (0.03–0.25 inch), preferably in the range of about 1.6 to 3.2 mm (0.063–0.126 inch). The sheet material from which the lower (or backing) layer or surface is formed typically has a thickness in the range of about 0.76 to 6.4 mm (0.03–0.25 inch), preferably about 3.2 mm (0.126 inch).

The thermoplastic article of the present invention may be produced by subjecting the laminate to temperatures and pressures sufficient to cause the upper or lower sheet materials to bond (or fuse) to the decorative layer. However, temperatures which cause decomposition, distortion, or other undesirable effects in the finished article or sheet material, should be avoided. Avoidance of such extreme temperatures is an advantage of the miscible polyester/polycarbonate sheet materials of the present invention compared to the use of neat polycarbonate sheet. Normally, the bonding temperatures are in the range of about 90 to 300° C. (194 to 572° F.), preferably in the range of about 129 to 260° C. (265 to 500° F.). The pressures utilized in the bonding or laminating of the thermoplastic article of the invention preferably are in the range of about 0.65 to 3.45 MPa (about 95 to 500 pounds per square inch—psi). The optimal temperature for bonding the thermoplastic articles will vary depending, for example, on the particular miscible copolyester/polycarbonate blend employed and the thickness of the sheet materials used, and may be determined by those skilled in the art. The laminate is held at the appropriate temperature and pressure for about 4 to 24 minutes, or until such time as a bond is formed between the upper and lower sheet materials. After 4 to 24 minutes, the bonded/fused thermoplastic article is allowed to cool under pressures from about 0.69 to 2.4 MPa (about 100 to 350 psi), preferably about 1.4 MPa (200 psi), until it cools below the glass transition temperature of the miscible polyester/polycarbonate blend sheet material. During the bonding process, the miscible polyester/polycarbonate blend sheet material may be bonded or fused to the decorative material without the use of an adhesive. The lamination process may utilize adhesives or coupling agents on the fabric to enhance the adhesion of the thermoplastic sheet materials to the decorative material.

The miscible polyester/polycarbonate blends constituting the sheet materials used in the manufacture of the articles and sheeting of the present invention may not be as hard or scratch resistant as may be necessary or desired for certain end uses. For example, an end use in which the exterior surface of the thermoplastic article may be subjected to scratching or abrasion, i.e., in a privacy partition, may require the application of an abrasion-resistant coating to the exterior surface. For example, films consisting of fluorinated hydrocarbons, poly(perfluoroethylene) such as TEDLAR from duPont Chemical Company or oriented poly(ethylene terephthalate) such as MYLAR from duPont Chemical Company may be used to improve both chemical and abrasion resistance. The abrasion resistant film typically has a thickness in the range of about 0.025 to 0.254 mm (0.001–0.01 inch), preferably about 0.051 to 0.178 mm (0.002–0.007 inch), and most preferably about 0.076 mm (0.003 inch). However, abrasion resistant film thinner or thicker than these ranges may be used since the thickness of such film is limited only by the equipment available cost and functionality considerations. An adhesive optionally may be used between the miscible copolyester/polycarbonate blend and the abrasion resistant film.

Alternatively, an abrasion resistant coating may be applied to a plastic film and then the film bearing the abrasion resistant coating may be laminated to one or both sides of the article of the present invention. The film may be selected from a number of thermoplastic materials compatible with the lamination process such as poly(vinyl chloride), PETG copolyester, poly(ethylene terephthalate), poly(methyl methacrylate), polycarbonate, miscible polyester/polycarbonate blends, and the like. PETG is defined herein as a polyester comprising, terephthalic acid, ethylene glycol and 1,4-cyclohexanedimethanol. Preferably, PETG comprises from 80 to 100 mole % terephthalic acid, 20 to 60 mole % 1,4-cyclohexanedimethanol and 80 to 40 mole % ethylene glycol based on the mole percentages for diacids totaling 100 mole % and the mole percentages for diols totaling 100 mole %.

The film thickness may range from 0.0025–0.381 mm (0.001–0.015 inch) with a thickness of 0.0762–0.203 mm (0.003–0.008) being most preferred. The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is 0.0076–0.051 mm (0.0003–0.002 inch) with thickness of about 0.0127 mm (0.0005 inch) being most preferred.

These coatings may be applied in a manner similar to the application of paints. The coatings exist either as predominantly undiluted material with very little volatile content or as solvent- or water-based materials. In addition to being applied to a film that can be laminated to the structure as part of the process, they may be applied directly to the finished product. Application may be carried out by a variety of techniques such as roll, paint, spray, mist, dip and the like.

The thermoplastic article or laminate, based on the miscible polyester/polycarbonate blend, can be subsequently shaped and thermoformed into a variety of useful products. As an illustrative example, the thermoplastic article can be thermoformed or otherwise shaped into sliding glass doors, shower doors, entrance doors, privacy partitions, multi-paned windows, and tabletops and other furniture pieces. Depending on the nature of the decorative material, the thermoplastic articles of this invention may be formed, heat draped, or molded. In addition, the articles of the present invention have an appealing appearance with low density to facilitate transport and installation of building materials produced there from.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

Example 1

Two decorative laminates are prepared for this example. Laminate A is comprised of a polyethylene based fabric placed on the top of one of the surfaces of a ¼" sheet of a miscible copolyester/polycarbonate blend (75 wt % PCTG/25 wt % PC). The total laminate thickness is approximately ¼". Laminate B is comprised of a polyethylene based fabric placed on the top of one of the surfaces of a ¼" sheet of a neat copolyester (PETG). The laminate sheet, which measures 2'×2', is then placed in a clamped frame and subjected to a uniform load (10 psi) at 60 C. After 10 hours, the center (maximum) deflection of the two laminates, still under load, was measured. Laminate A had a deflection of 3.5", while laminate B had a deflection of 4.5". PETG in this example is poly(ethylene terephthalate) modified with 31 mole % 1,4-cyclohexanedimethanol. PCTG in this example is poly(cyclohexylenedimethylene terephthalate) modified with 34 mole % ethylene glycol. PC in this example refers to polycarbonate, namely, bisphenol A.

Example 2

Two decorative laminates are prepared for this example. Laminate A is comprised of a polyethylene based fabric placed on the top of one of the surfaces of a ⅛" sheet of a miscible copolyester/polycarbonate blend (75 wt % PCTG/25 wt % PC). The total laminate thickness is ⅛". Laminate B is comprised of a polyethylene based fabric placed on the top of one of the surfaces of a ⅛" sheet of a neat (PC). The two laminate sheets, A and B, prepared measures 2'×2'. The two laminates are allowed to equilibrate to the lab environment, in particular moisture level, for two months.

After equal equilibration, the two laminates are placed into a Brown thermoforming unit to form a shaped article, in this case a cup. Observations for blistering are conducted. PCTG in this example is poly(cyclohexylenedimethylene terephthalate) modified with 34 mole % ethylene glycol. PC in this example is polycarbonate, namely, bisphenol A.

The invention has been described in detail with particular reference to preferred embodiments thereof, but it will be understood that variations and modifications can be effected within the spirit and scope of the invention.

We claim:

1. A thermoplastic article having one or more decorative materials on the surface thereof obtained by applying heat and pressure to one or more laminates wherein at least one of said laminates comprises (1) one or more decorative materials; and (2) at least one upper or at least one lower sheet material; wherein the upper or lower sheet materials are formed from a polyester/aromatic polycarbonate blend, comprising:
    (a) 1 to 99 weight % of a polyester comprising a diacid residue component selected from the group consisting of aliphatic, or alicyclic dicarboxylic acids, and/or aromatic dicarboxylic acids, wherein the aromatic portion of said aromatic dicarboxylic acid has 6–20 carbon atoms, wherein the aliphatic or alicyclic portion of said aliphatic or alicyclic dicarboxylic acid has 3–20 carbon atoms; and a glycol residue component comprising from 45 mole % to 100 mole % 1,4-cyclohexanedimethanol, and, optionally, at least one additional aliphatic glycol having 2–20 carbon atoms; wherein the total mole percentages for the glycol component equals 100 mole %.
    (b) 99 to 1 weight % of an aromatic polycarbonate; wherein the total combined weight percentage of polyester and polycarbonate in the polyester/polycarbonate blend equals 100 weight %.

2. The thermoplastic article of claim 1 wherein the polyester/aromatic polycarbonate blend comprises said polyester in the amount of 50 to 90 weight % and said aromatic polycarbonate in the amount of 50 to 10 weight %.

3. The thermoplastic article of claim 2 wherein the polyester/aromatic polycarbonate blend comprises said polyester in the amount of 60 to 80 weight % and said aromatic polycarbonate in the amount of 40 to 20 weight %.

4. The thermoplastic article of claim 1 wherein the polyester in said polyester/aromatic polycarbonate blend comprises the formula:

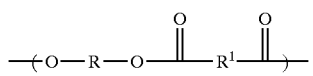

wherein R is the diol residue component comprising the residue of 45 to 100 mole % 1,4-cyclohexanedimethanol and 55 to 0 mole % of at least one aryl, alkane or cycloalkane containing diol having 2 to 20 carbon atoms or chemical equivalent thereof; and wherein $R^1$ is the diacid residue component comprising the decarboxylated residue derived from an aryl, aliphatic, or cycloalkane containing diacid of 3 to 20 carbon atoms or chemical equivalent thereof.

5. The thermoplastic article of claim 4 wherein said diol residue component of said polyester is selected from the group consisting of ethylene glycol, 1,2-propylene glycol, 1,3-propanediol, 1,4-butanediol, 1,5-pentanediol, 1,6-hexanediol, 1,2- or 1,3-cyclohexanedimethanol, neopentyl glycol, and 2,2,4,4 tetramethyl-1,3-cyclobutanediol.

6. The thermoplastic article of claim 4 wherein said diacid residue component of said polyester is selected from the group consisting of the following acids: malonic, succinic, glutaric, adipic, pimelic, suberic, azelaic, sebacic, dodecanedioic, 1,4-, 1,5-, and 2,6-decahydronaphthalenedicarboxylic acid, and cis- or trans-1,4-cyclohexanedicarboxylic acid, terephthalic acid, isophthalic acid, 4,4'-biphenyidicarboxylic, trans 3,3'-and trans 4,4 stilbenedicarboxylic, 4,4'-dibenzyldicarboxylic, and 1,4-, 1,5'-, 2,3-, 2,6, and 2,7-naphthalenedicarboxylic.

7. The thermoplastic article of claim 1 wherein said polyester of said polyester/aromatic polycarbonate blends comprises terephthalic acid and 1,4-cyclohexanedimethanol.

8. The thermoplastic article of claim 7 wherein said polyester of said polyester/aromatic polycarbonate blends comprises terephthalic acid, 1,4-cyclohexanedimethanol, and ethylene glycol.

9. The thermoplastic article of claim 4 wherein said polyester comprises terephthalic acid in the amount of 80 to 100 mole %, 1,4-cyclohexanedimethanol in the amount of 45 to 100 mole % and ethylene glycol in the amount of 0 to 55 mol %.

10. The thermoplastic article of claim 9 wherein said polyester comprises terephthalic acid in the amount of 80 to 100 mole %, 1,4-cyclohexanedimethanol in the amount of 60 to 80 mole % and ethylene glycol in the amount of 40 to 20 mole %.

11. The thermoplastic article of claim 1 wherein said polyester of said polyester/aromatic polycarbonate blends comprises terephthalic acid, isophthalic acid, and 1,4-cyclohexanedimethanol.

12. The thermoplastic article of claim 11 wherein said polyester comprises terephthalic acid in the amount of 50 to 95 mole %, isophthalic acid in the amount of 5 to 50 mole %, and 1,4-cyclohexanedimethanol in the amount of 90 to 100 mole %.

13. The thermoplastic article of claim 12 wherein said polyester comprises 1,4-cyclohexanedimethanol in the amount of 100 mole %.

14. The thermoplastic article of claim 1 wherein said polyester comprises branching agents selected from polyfunctional acids, polyfunctional glycols and acid/glycol hybrids.

15. The thermoplastic article of claim 14 wherein said branching agents are selected from the group consisting of trimesic acid, trimellitic anhydride, pyromellitic acid, pyromellitic anhydride, trimethylopropane, dimethyl hydroxyl terephthalate, and pentaerythritol.

16. The thermoplastic article of claim 1 wherein said aromatic polycarbonate is produced from the reaction of one or more dihydric phenols with a carbonate precursor.

17. The thermoplastic article of claim 1 wherein said dihydric phenol is selected from the group consisting of 2,2-bis-(4-hydroxyphenyl)-propane), 3,3,5-trimethyl-1,1-bis(4-hydroxyphenyl)-cyclohexane, 2,4-bis-(4-hydroxyphenyl)-2-methyl-butane, 1,1-bis-(4-hydroxyphenyl)-cyclohexane, .alpha,.alpha.'-bis-(4-hydroxyphenyl)-p-diisopropylbenzene, 2,2-bis-(3-methyl4-hydroxyphenyl)-propane, 2,2-bis-(3-chloro-4-hydroxyphenyl)propane, bis-(3,5-dimethyl4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane,.alpha., .alpha.'-bis-(3,5-dimethyl-4-hydroxyphenyl)-p-diisopropylbenzene and 4,4'-sulfonyl diphenol, hydroquinone, resorcinol, bis-(hydroxyphenyl)-alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and alpha.,alpha.-bis-(hydroxyphenyl) diisopropylbenzenes.

18. The thermoplastic article of claim 17 wherein said dihydric phenol is 2,2-bis-(4-hydroxyphenyl)-propane.

19. The thermoplastic article of claim 16 wherein said carbonate precursor is selected from the group consisting of a carbonyl halide, a diarylcarbonate, and a bishaloformate.

20. The thermoplastic article of claim 19 wherein said carbonyl halide is selected from the group consisting of carbonyl bromide, carbonyl chloride, and mixtures thereof.

21. The thermoplastic article of claim 19 wherein said bishaloformates are selected from the group consisting of bischloroformates of 2,2-bis (4-hydroxyphenyl)-propane, hydroquinone, and the like and bishaloformates of glycol.

22. The thermoplastic article of claim 20 wherein said carbonyl halide is carbonyl chloride.

23. The thermoplastic article of claim 19 wherein said diarylcarbonate is diphenyl carbonate.

24. The thermoplastic article of claim 1 wherein said polycarbonate comprises one or more branching agents selected from the group consisting of tri- and tetrafunctional phenols, carbonic acids, and bisphenols with carbonic acid side chains.

25. The thermoplastic article of claim 1 wherein said polycarbonate comprises one or more branching agents selected from 1,4-bis(4',4"-dihydroxytriphenylmethyl) benzene, and trisphenol TC.

26. The thermoplastic article of claim 1 wherein said polycarbonate comprises nitrogen-containing branching agents.

27. The thermoplastic article of claim 1 wherein said polycarbonate comprises one or more branching agents selected from the group consisting of cyanic chloride and 3,3-bis(4-hydroxyphenyl)-2-oxo-2,3-dihydroindole.

28. The thermoplastic article of claim 1 wherein said blend comprises one or more additives selected from the group consisting of impact modifiers, UV stabilizers, phosphorous stabilizers, nucleating agents, extenders, flame retarding agents, reinforcing agents, fillers, antistatic agents, mold release agents, colorants, antioxidants, extrusion aids, slip agents, release agents, carbon black, and other pigments.

29. The thermoplastic article of claim 1 wherein said decorative material is selected from the group consisting of selected from the group consisting of metallic wire, rods or bars; natural fibers, glass fibers, mineral fibers, fabric, papers; and printed layers.

30. The thermoplastic article of claim 1 wherein the upper or lower sheet material has a thickness in the range of 0.76 to 6.4 mm and the thickness of said decorative material is in the range of 0.254 to 5.08.

31. The thermoplastic article of claim 1 wherein the article includes an abrasion-resistant coating on one or both of the outside surfaces of the article.

32. The thermoplastic article of claim 31 wherein the abrasion resistant coating is provided as a film having a thickness in the range of 0.0127 to 0.254 mm.

33. The thermoplastic article of claim 31 wherein the abrasion resistant film is provided as a fluorinated hydrocarbon, poly(perfluoroethylene), acrylic or oriented poly(ethylene terephthalate) film having a thickness in the range of 0.017 to 0.254 mm.

34. The thermoplastic article of claim 31 wherein the abrasion resistant coating is a heat-, ultraviolet- or electron beam-cured material on a film of poly(vinyl chloride), PETG copolyesters, poly(ethylene terephthalate), poly (methyl methacrylate) or polycarbonate.

35. The thermoplastic article of claim 31 wherein the abrasion resistant coating is a heat-cured silicone, polyurethane or fluorinated polyurethane or an ultraviolet- or electron beam-cured material selected from modified acrylates containing polyurethane, fluorinated polyurethane, silicone, epoxy, polyester, polyether or caprolactone residues.

* * * * *

UNITED STATES PATENT AND TRADEMARK OFFICE
CERTIFICATE OF CORRECTION

PATENT NO. : 6,896,966 B2
DATED : May 24, 2005
INVENTOR(S) : Crawford et al.

It is certified that error appears in the above-identified patent and that said Letters Patent is hereby corrected as shown below:

Column 12,
Line 6, "biphenyidicarboxylic" should read -- biphenyldicarboxylic --.

Column 14
Line 7, "selected from the group consisting of selected from the group consisting of" should read -- selected from the group consisting of --.

Signed and Sealed this

Twenty-fourth Day of January, 2006

JON W. DUDAS
*Director of the United States Patent and Trademark Office*